United States Patent
Weber et al.

(10) Patent No.: US 6,796,483 B1
(45) Date of Patent: Sep. 28, 2004

(54) METHOD AND DEVICE FOR PRODUCING A SOLDERED JOINT

(75) Inventors: Stefan Weber, Wertheim (DE); Alfred Kemper, Warstein (DE)

(73) Assignee: Pink GmbH Vakuumtechnik, Wertheim (DE)

( * ) Notice: Subject to any disclaimer, the term of this patent is extended or adjusted under 35 U.S.C. 154(b) by 0 days.

(21) Appl. No.: 10/129,575

(22) PCT Filed: Nov. 2, 2000

(86) PCT No.: PCT/DE00/03848

§ 371 (c)(1),
(2), (4) Date: May 6, 2002

(87) PCT Pub. No.: WO01/34334

PCT Pub. Date: May 17, 2001

(30) Foreign Application Priority Data

Nov. 8, 1999 (DE) .......................... 199 53 654

(51) Int. Cl.⁷ ............................ B23K 1/008; B23K 3/04
(52) U.S. Cl. ........................ 228/219; 228/8; 228/221; 228/42; 228/46; 228/200
(58) Field of Search ................................ 228/102, 103, 228/8, 10, 219, 42, 43, 46, 200; 219/390, 394, 453.11, 452.13; 392/416, 418; 432/128, 225, 227, 230

(56) References Cited

U.S. PATENT DOCUMENTS

| | | | |
|---|---|---|---|
| 3,882,596 A | * | 5/1975 | Kendziora et al. .......... 228/200 |
| 3,926,415 A | * | 12/1975 | Konas et al. ............... 266/252 |
| 4,496,312 A | * | 1/1985 | Yamada et al. ............. 432/11 |
| 4,568,277 A | * | 2/1986 | MacInnes et al. ........... 432/120 |
| 4,605,161 A | | 8/1986 | Motomiya et al. |
| 4,804,128 A | | 2/1989 | Brittin |
| 4,932,864 A | * | 6/1990 | Miyabe ........................ 432/128 |
| 5,052,923 A | * | 10/1991 | Peter et al. .................. 432/205 |
| 5,128,506 A | | 7/1992 | Dahne et al. |
| 5,341,978 A | | 8/1994 | Halstead et al. |
| 5,341,980 A | * | 8/1994 | Nishikawa et al. ......... 228/205 |
| 5,405,074 A | | 4/1995 | Den Dropper et al. |
| 5,516,031 A | * | 5/1996 | Nishikawa et al. ......... 228/205 |
| 5,562,243 A | * | 10/1996 | Marcantonio ................. 228/8 |
| 5,722,825 A | * | 3/1998 | Edenhofer ................... 432/138 |
| 5,782,402 A | | 7/1998 | Wieres |
| 5,878,942 A | | 3/1999 | Kodama et al. |
| 6,039,236 A | * | 3/2000 | Den Dopper ................ 228/46 |

FOREIGN PATENT DOCUMENTS

| | | |
|---|---|---|
| DE | 29 08 829 C3 | 9/1979 |
| DE | 29 08 829 A1 | 9/1979 |
| DE | 37 37 563 A1 | 5/1989 |
| DE | 38 43 191 C1 | 3/1990 |
| JP | 54118358 A * | 9/1979 |
| JP | 3-106562 | 5/1991 |
| JP | 4-127958 | 4/1992 |

* cited by examiner

*Primary Examiner*—Kiley Stoner
*Assistant Examiner*—Kevin McHenry
(74) *Attorney, Agent, or Firm*—McGlew and Tuttle, P.C.

(57) ABSTRACT

A method and device is provided for thermal treatment of workpieces or components, in particular for producing a soldered joint between a solder material and at least one component or workpiece which is used as a carrier for said solder material, by melting of the solder material arranged on the solder material carrier. At least one component is heated in a melt chamber (12) in a process atmosphere which is sealed off from the environment. In a subsequent step the component is cooled in a cooling chamber (13) in a process atmosphere which is sealed off from the environment. The component is heated and cooled in process chamber (12, 13) which are independent of each other.

16 Claims, 3 Drawing Sheets

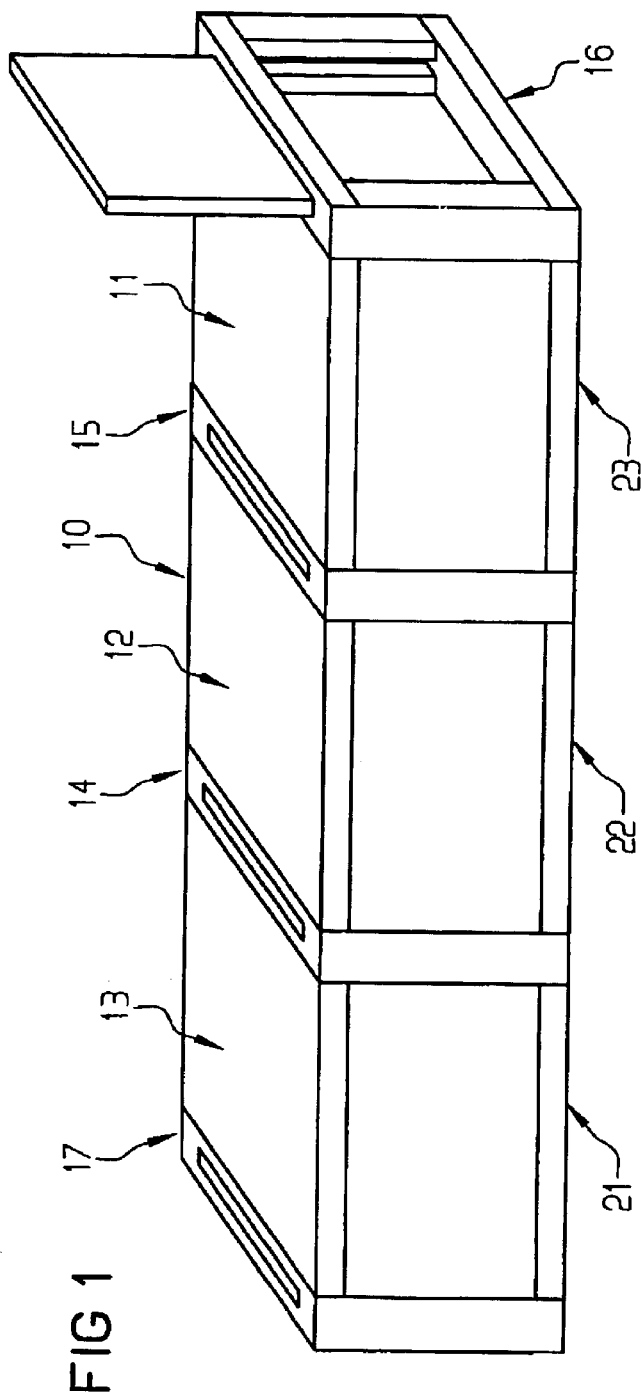
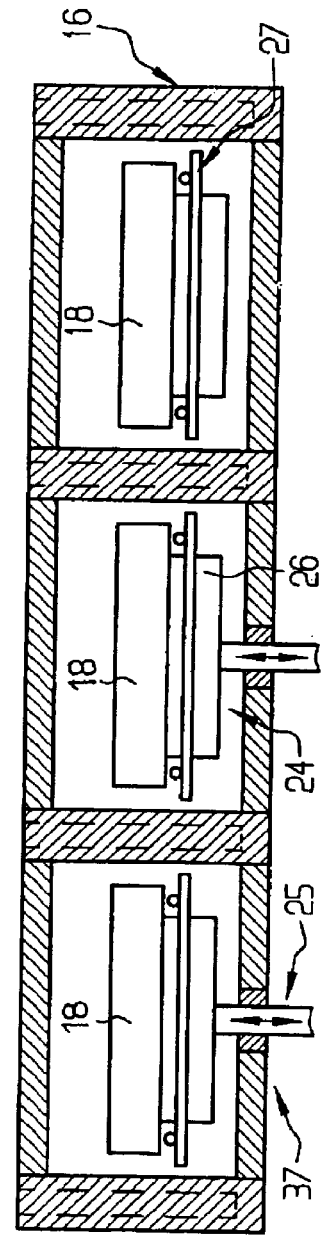
FIG 1
FIG 2

METHOD AND DEVICE FOR PRODUCING A SOLDERED JOINT

FIELD OF THE INVENTION

The present invention relates to methods for thermal treatment of workpieces or components, in particular for producing a soldered joint between a solder material and at least one component or workpiece used as a solder material carrier by melting of the solder material arranged on the solder material carrier, wherein at least one component is heated in a process atmosphere sealed off from the environment. In addition, the invention relates to a device appropriate for carrying out this method.

BACKGROUND OF THE INVENTION

A method or a device of the aforementioned type is known from DE 29 08 829 C3 which describes a method for performing a hard soldering procedure in an evacuated process chamber, wherein components to be joined together by melting of a hard solder are joined together. During the hard solder procedure a vacuum is formed in the process chamber and heating of the components to be joined together takes place at approximately 600° C.

With this known method a subsequent cooling procedure takes place outside the process chamber in a normal environmental atmosphere.

U.S. Pat. No. 5,782,402 describes a method and a device for producing a soldered joint, whereby the device comprises three chambers which are evacuated for performing the method, such that both the heating and cooling procedure take place in a vacuum. Simultaneous loading of the chambers and thus increased conversion are enabled by the chambers sealed off from the environment.

U.S. Pat No. 5,341,978 describes a device for carrying out a soldering procedure which takes place in a nitrogen atmosphere to avoid oxidation of the workpieces, whereby the nitrogen introduced into the chambers is first evaporated in a cavity limited by an inner and an outer wall of the cooling chamber in order to then be conveyed from the cavity limited by the chamber walls to tire inside of the chambers. There it serves as cooling or oxidation protection. The heat released by the cooling method is used at the same time to accelerate heating of the gas.

SUMMARY OF THE INVENTION

The object of the present invention is to propose a method or a device, wherein not only heating of a component, in particular for melting, the solder material, but also cooling of the component in a defined process atmosphere take place, without the heating procedure and the cooling procedure impairing each other.

In the method according to the present invention cooling of the component takes place in a procedural step following on from the heating step in a process atmosphere sealed off from the environment, whereby heating of the component or melting of the solder material and cooling of the component takes place in process chambers independent of one another.

The method according to the present invention basically lends itself for use generally for temperature application to workpieces or components for thermal treatment, such as tempering, annealing and the like, for example. A particular area of application is the production of soldered joints which can be designed both as hard soldered joint and as soft soldered joint, such as for example in the manufacture of electronic components and assemblies.

With the manufacture of soldered joints in particular the method according to the present invention enables not only a cooling procedure controlled similarly to the melting procedure without the procedures mutually influencing one another, but also effective execution of the soldering procedure including the cooling procedure based on the process chambers specified with respect to their task in each case. Reciprocal influencing of both procedures is opposed by the possibility of the formation of different process atmospheres in the various process chambers. In addition, an overall higher quality of the soldered joint results from the cooling carried out in a defined process atmosphere. This proves to be particularly advantageous whenever the soldered joint has not only mechanical connecting functions, as with the connection between metallic components, but also an electrical connecting function, such as for example in the case of boards fitted with electronic components in the SMD (surface-mounted device) method and which are connected by way of a soldered joint mechanically and electrically conductively to the strip conductors of the boards.

With use of the method according to the present invention for mechanically connecting metallic components by means of a soldered joint in particular it proves to be advantageous if in a procedural step preceding melting of the solder material the solder material carrier is prepared by application with a reducing or inert process atmosphere and/or by radiation or with materials in a separate process chamber. This makes it possible, without impairing a process atmosphere particularly suitable for the subsequent melting procedure, to prepare the solder material carrier, for example the metallic components. For this purpose it may be possible to introduce a reduction agent, such as formic acid or the like, into the process chamber, or also to generate a reducing gas atmosphere in the process chamber, whereby before the solder material carrier or the components to be joined together are transferred to the subsequent process chamber for performing the melting procedure the process chamber can be rinsed to counteract any influence of the process atmosphere which has formed in the subsequent process chamber. Such preparation of the solder material carriers or of the components to be joined together can also be effected by plasma application of the components or of the contact surfaces to be moistened with the solder material in the subsequent melting procedure.

A further possibility of counteracting reciprocal influence of the various process atmospheres which have formed in the various process chambers, consists of establishing a vacuum in the respective process atmospheres or the process chambers.

There is also the possibility of creating the process atmosphere in each process chamber as a protective gas atmosphere.

The simplest possible method for adjusting the temperature of the component is feasible if the temperature application occurs by means of a tempering device which is operated to heat or cool the component with a substantially constant temperature. This altogether enables short processing times, because heating or cooling tunes of the tempering device do not apply with continuous operation of the tempering device. For shortening the tempering period or for increasing the tempering rate it has proven advantageous if the temperature of the tempering device is selected clearly higher than the desired processing or soldering temperature.

The simplest possible method for adjusting the temperature of the solder material and/or of the solder material carrier when a soldered joint is being produced is likewise enabled by such a temperature application.

An advantageous form of regulating is enabled if the tempering device is operated as a radiator device, and the temperature of the component or of the solder material carrier is adjusted over the distance of the radiator device from the component or from the solder material carrier.

If the radiator device is combined with a contact device and temperature application occurs at least in one starting phase of the heating or cooling by means of conveying heat or cold, then it is possible to considerably shorten, the heating or cooling periods.

The device according to the present invention for carrying out the abovementioned method has a heating chamber or a melt chamber, in which heating of the component takes place, in particular for melting a solder material for producing a soldered joint arranged on a component serving as solder material carrier, and a cooling chamber for cooling the component attached to the melt chamber, whereby the heating chamber or the melt chamber and the cooling chamber form process chambers independent of one another.

For preparing the solder material carrier for the soldered joint a preparation chamber, which forms a process chamber independent of the melt chamber, can be arranged in front of the melt chamber.

If the process chambers are designed as separate modular units, which can be connected to one another via door mechanisms, the device according to the present: invention can easily be adapted in construction to various methods, so that for example in one particular case the device can be constructed only from a melt chamber and a cooling chamber as required, and in another case by a preparation chamber, a melt chamber to and a cooling chamber, whereby at least partially identical modular units can be utilized to construct the respective device.

It is also possible to build up the process chambers in a modular fashion, in such a way that the door mechanisms are designed as door modules and can be combined with chamber modules to construct the process chambers.

For temperature application of the component arranged on a carrier device in the process chambers formed by the melt chamber or the cooling chamber it is an advantage to provide a radiator device which can be altered in its distance relative to the carrier device or the component by means of a distance alteration device. A temperature application device so designed enables the radiator device to be operated at an essentially constant temperature, whereby the distance of the radiator device relative to the carrier device can be altered to make a change to the temperature of the carrier device heated by the radiator device.

In the need to accelerate heating of the carrier device and thus overall to shorten the sojourn time of the solder material carriers necessary for carrying out the melting in the melt chamber or the instances of cooling in the cooling chamber, it has also proven advantageous to provide the radiator device with a contact device which also enables temperature transmission via heat conduction, apart from temperature transmission via radiation. With use of the radiator device for cooling the component or the solder material carrier the radiator device can be combined with a convection device to improve cooling efficiency.

The simplest possible design of the radiator device with simultaneous formation of a contact device is feasible if the radiator device is designed as a temperable plate, whose surface serves as contact device.

To regulate the distance of the radiator device from the carrier device depending on a desired temperature of the carrier device it proves advantageous to provide the carrier device or the solder material carrier with a temperature sensor, whose output signal serves to define a correcting variable for altering the distance of the radiator device relative to the carrier device. The temperature sensor, which serves to determine the temperature of the carrier device, can also be arranged directly on the radiator device, thus for example on the plate, whereby a touch contact with the carrier device can be guaranteed by a connecting device compensating the modified distance between the plate and the carrier device, such as for example a spring device, independently of the respective distance between the plate and the carrier.

In particular, when the method according to the present invention is designed as a continuous process, wherein the solder material carriers arranged on the carrier device are guided through the subsequently arranged process chambers in a clocked manner while specific sojourn tines in the individual process chambers are adhered to, it has proven advantageous to fit the carrier devices with an information medium which cooperates with a reader device, such that after a carrier device enters a first process chamber the process running in the first and subsequently arranged process chambers is controlled by the information contained on the information medium.

A particularly economical application of the device is feasible if the device comprising at least one heating chamber and a cooling chamber is integrated into a working or manufacturing line as part device in an in line arrangement. When the device for producing SMD boards is used a mounting device for mounting the SMD boards can be connected to the device, for example.

A preferred variant of the method according to the present invention as well as an exemplary device are explained in greater detail hereinbelow with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a simplified perspective illustration of a possible embodiment of the device according to the present invention;

FIG. 2 is a longitudinal sectional illustration of the device shown in FIG. 1;

DESCRIPTION OF THE PREFERRED EMBODIMENT

Figure 3:
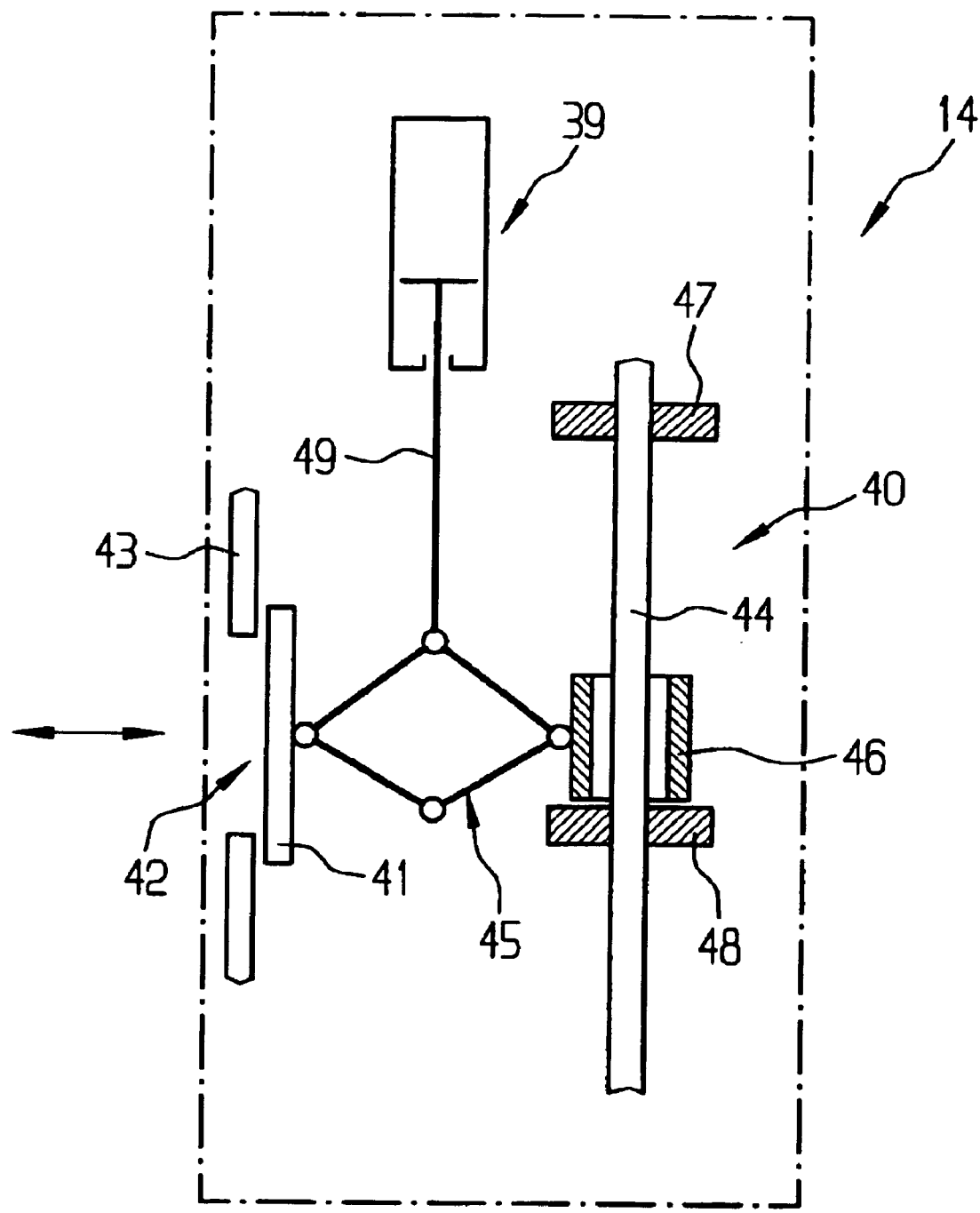
FIG. 3 is a schematic representation of a door mechanism.

Referring to the drawings in particular, FIG. 1 illustrates a soldering device 10 with several process chambers arranged in series, namely a preparation chamber 11, a melt chamber 12 and a cooling chamber 13. The separate process chambers 11, 12 and 13 are connected to one another by way of door mechanisms 14 and 15, whereby in addition to this in the illustrated embodiment the outer process chambers 11 and 13 each have a door mechanism 16 or 17 for entry or exit of the carrier devices 18 illustrated in FIG. 2. Solder material carriers are arranged on the carrier devices 18 (not illustrated here in greater detail) which are to be provided with soldering or a soldered joint by melting a solder material.

As clearly shown in FIG. 1, the individual process chambers 11, 12 and 13 are designed in a modular fashion and each exhibits a chamber module 21 complemented by at least one door mechanism 14, 15, 16 or 17 which is combined with the chamber module 21, 22 or 23 to form the respective process chamber. It is apparent from this that the series arrangement of a total of three process chambers for forming the soldering device 10 illustrated in FIG. 1 can be complemented by connecting other process chambers in a modular fashion, to be able to connect other uncoupled partial processes for expanding the process, apart from the partial processes of the overall process uncoupled from one another and running in the preparation chamber 11, the melt chamber 12 and the cooling chamber 13.

As illustrated by FIG. 2, the soldering device 10 illustrated here by way of example enables a method to be carried into effect, wherein in a first procedural step the solder material carrier or carriers, not shown here in greater detail, are first prepared in the preparation chamber 11. For this the carrier device 18 is introduced into the preparation chamber 11, followed by evacuation of the preparation chamber 11 and/or addition of a reducing agent to the preparation chamber 11 to create the desired process atmosphere. In the event where the solder material carriers, not illustrated in greater detail here, are metallic components to be joined to one another by means of a soldered joint, it may be conceivable to create a reducing process atmosphere by addition of formic acid in the preparation chamber 11. After the desired reduction result is achieved the preparation chamber 11 can be rinsed with a nitrogen/hydrogen gas mixture.

The carrier device 18, as illustrated in FIG. 2, is arranged in the preparation chamber 11 on a transport device 27 which enables the carrier device 18 to be retracted into the preparation chamber 11 via the open door mechanism 16, as well as enabling transfer of the carrier device 18 to the melt chamber 12 after the door mechanism 15 is opened. After the desired process atmosphere has been set in the melt chamber 12, for example after creating a reducing atmosphere, or also art inert atmosphere by formation of a protective gas atmosphere in the melt chamber 12, heating of the carrier device 18 to the desired soldering temperature is carried out. Such heating is carried out by means of a heating device 24 which has a hot plate 26 arranged on a hoisting mechanism 25.

FIG. 3 shows an example of the structure of a door mechanism 14, 15 or 16. The door mechanism 14 enables—as indicated by the double arrow in FIG. 3—sealing of the process chambers 11, 12, 13 independent of the direction or pressure to create the varying process atmosphere formed in the process chambers 11, 12, 13 (FIG. 2). The door mechanism 14 has an actuation device 39 here formed by a double actuating cylinder, a guide device 40 and a door panel 41, which by means of the guide device 40 can be moved away towards a door opening 42 of a process chamber wall 43, or from the door opening 42. In the illustration according to FIG. 3 the door panel 41 is positioned directly in front of the sealing arrangement on the process chamber wall 43. The guide device 40 comprises a slide rod 44 arranged parallel to the plane of the door opening 42 along which a double knee lever 45 is guided by means of a slide block 46. To transfer the door panels 41 from an opening position into a closed position the slide block 46 is moved downwards starting from an upper slide stop 47, until the travel movement of an actuating cylinder piston 49 acts directly on the double knee lever 45 after a lower slide stop 48 is reached, such that the door panel 41 is moved towards the process chamber wall 43 until a seal is obtained.

Figure 4A:
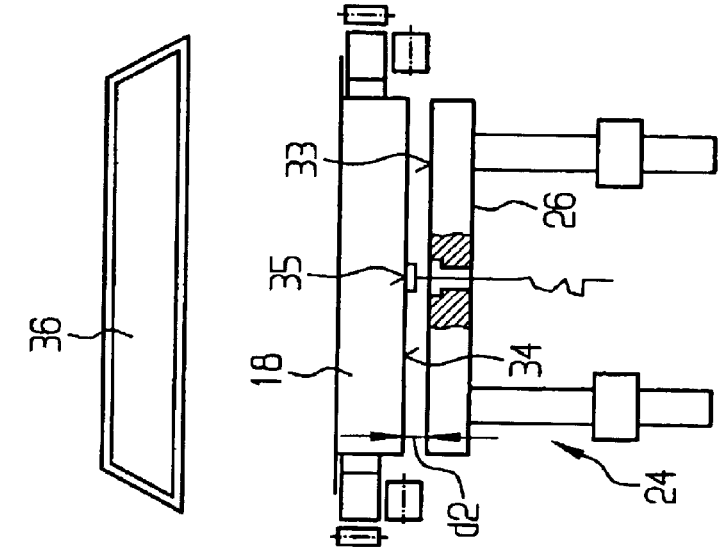
FIG. 4a is an illustration of an embodiment of the radiator device in a basic configuration.

A possible construction of the heating device 24 and its functioning is explained in greater detail with reference to FIGS. 4a to 4c. FIG. 4a shows the heating device 24 in its basic configuration, in which the hot plate 26 is located at a distance d1 from the carrier device 18 underneath the carrier device 18. As FIG. 4a further depicts, the carrier device 18 is held in its relative position compared to the heating device 24 by the transport device 27 which in the present case is formed by feed billets 28 and 29 rotating in the vicinity of the process chambers 11, 12 and 13.

In the present case the hot plate 26 is arranged on a hoist mechanism 25 formed by two lifting rams 30 and has a temperature sensor 32 housed in a spring arrangement 31. In the basic configuration illustrated in FIG. 4a the spring arrangement 31 is unstressed, so that the temperature sensor 32 is arranged projecting out of a contact surface 33 of the hot plate 26.

Figure 4B:
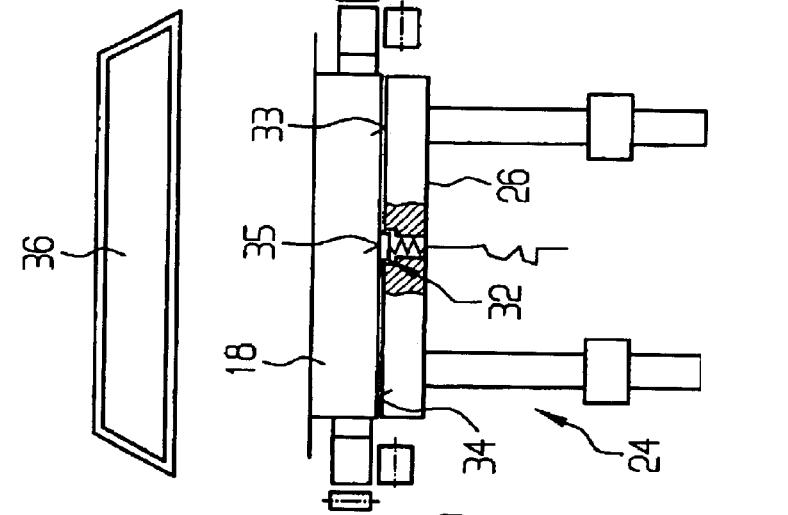
FIG. 4b is a view showing the radiator device illustrated in FIG. 3a in a heating configuration.
Figure 4C:
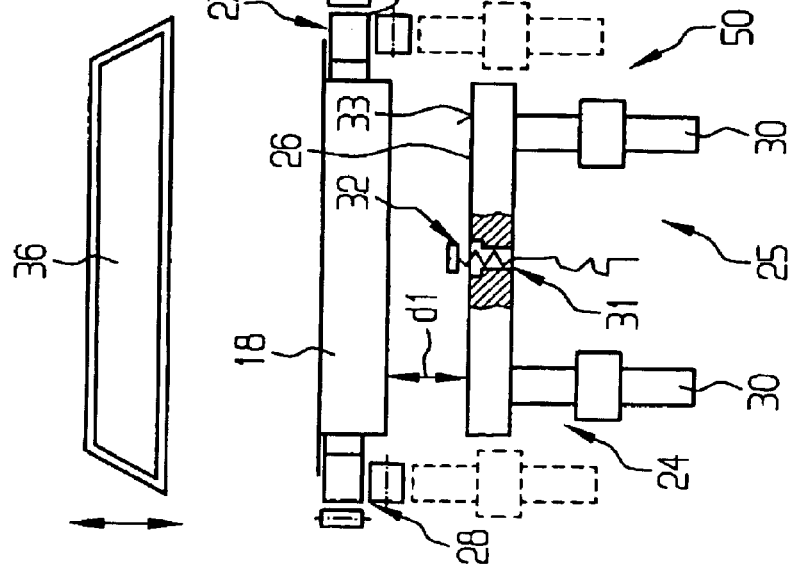
FIG. 4c is a view showing the radiator device illustrated in FIG. 3a in a temperature control configuration.

FIG. 4b now shows the heating device 24 in its heating configuration, in which the hot plate 26 lies with its contact surface 33 on an underside 34 of the carrier device 18, effectively transferring heat from the hot plate 26 to the carrier device 18 by thermal diffusion. At the same time the temperature sensor 32 is located in its position sunk in the contact surface 33 with its sensor surface 35 arranged flush in the contact surface 33, thus lying with the sensor surface 35 likewise on the underside 34 of the carrier device 18. The hot plate 26 is operated at a constant temperature and remains in the contact position illustrated in FIG. 4b until the temperature sensor 32 determines the desired temperature of the carrier device 18. Next, the hot plate 26 moves to a temperature control configuration illustrated in FIG. 4c, where the contact surface 33 of the hot plate 26 stands at a distance d2 from the underside 34 of the carrier device 18, whereby the temperature sensor 32 coerced by the spring arrangement 31 remains with its sensor surface 35 in contact with the carrier device 18. In the illustrated temperature control configuration of the hot plate 26 the hot plate 26 acts only as a radiator device and enables heat absorption in the carrier device 18 via radiation. This effectively prevents the temperature of the carrier from rising above the desired temperature by continuous application of the hot plate 26 operating at a constant temperature on the carrier device 18. Hereinbelow a change in the distance d2 between the underside 34 of the carrier device 18 and the contact surface 33 of the hot plate 26 is set depending on the temperature differences determined by the temperature sensor 32 relative to the nominal temperature of the carrier device by means of a setting device, not shown here in greater detail, as often as necessary, such that the nominal temperature of the carrier device 18 is kept above the sojourn time of the carrier device 18 required to realize the melting procedure in the melt chamber 12.

The above described distance control can occur, as indicated by the dashed representation in FIG. 4a, by means of a distance alteration device which provides a hoisting device 50 acting on the transport device 27 or the feed billets 28, 29 instead of a hoisting device acting on the hot plate. Essential for temperature control with a hot plate 26 operated essentially at a constant temperature is the possibility of altering the relative distance between the hot plate 26 and the carrier device 18 or the solder material carrier.

As illustrated in Fibs. 4a to 4c, the effect of the heating device 24 can be further complemented as required by additional heating devices, as for example a radiant panel hearing 36 arranged here above the carrier device 18. The radiant panel heating 36 can also be provided with a distance control corresponding in its working method to the distance control of the heating device 24.

As illustrated in FIG. 2, on completion of the melting phase in the melt chamber 12 the carrier device 18 is transferred to the cooling chamber 13, where a process atmosphere corresponding to or differing from the process atmosphere in the melt chamber 12 can be built up. The cooling chamber 13 is provided with a cooling device 37 which corresponds in particular with respect to the distance control in its design and working method to the heating device 24 illustrated in detail in FIGS. 4a to 4c. The cooling device 37 enables defined cooling of the carrier device 18 by a combination of cold radiation and cold diffusion, for example by effecting a predetermined cooling curve. Similarly to the heating device 24 the cooling device 37 can also be operated at a constant temperature, whereby the temperature of the carrier device 18 can be influenced by a change or adjustment of the distance between a cool plate 38 and the carrier device 18.

While specific embodiments of the invention have been shown and described in detail to illustrate the application of the principles of the invention, it will be understood that the invention may be embodied otherwise without departing from such principles.

What is claimed is:

1. A method for thermal treatment of workpieces or components for producing a soldered joint between a solder material and at least one component or workpiece which is used as a carrier for said solder material, the method comprising the steps of:

melting the solder material arranged on the solder material carrier by heating at least one component in a process atmosphere of a process chamber which is sealed off from the an environment wherein the heating of the component takes place in at least one independent process chamber having a process atmosphere; and cooling, in a subsequent step in a process atmosphere of another process chamber which is sealed off from the environment, wherein the cooling of the component takes place in at least one independent process chamber, independent of the process chamber for heating, having a different process atmosphere from the process chamber for heating.

2. The method as claimed in claim 1, wherein in a procedural step preceding heating of the component the component is prepared by application of a reducing or inert process atmosphere and/or via radiation or by application of a material in a separate process chamber.

3. The method as claimed in claim 1, wherein a vacuum is formed in the process atmospheres or the process chambers.

4. The method as claimed in claim 1, wherein the process atmosphere is designed as a protective gas atmosphere.

5. The method as claimed in claim 1, wherein temperature application for heating the component and/or for cooling the component occurs by way of a tempering device which can be heated or cooled, such that the tempering device for heating or cooling is operated at an essentially constant temperature.

6. The method as claimed in claim 5, wherein the tempering device is operated as a radiator device and the temperature of the component is adjusted by the distance of the radiator device from the component.

7. The method as claimed in claim 6 wherein the radiator device is combined with a contact device, such that temperature application takes place at least in one starting phase of the heating or cooling by means of conveying heat or cold.

8. A method according to claim 1, wherein prior to melting the process chamber is evacuated and prior to cooling the another process chamber is evacuated.

9. A method according to claim 1, wherein prior to establishing a process atmosphere in the process chamber for heating, the process chamber is evacuated and prior to establishing a process atmosphere in the another process chamber for cooling the another process chamber is evacuated.

10. A device for thermal treatment of workpieces or components for producing a soldered joint between a solder material and at least one component or workpiece which is used as a carrier for said solder material, comprising:

a heating or melting chamber, in which heating of a component takes place;

a cooling chamber, for cooling the component, connected to the heating or melt chamber, each of said heating or melting chamber and said cooling chamber forming process chambers independent of one another, wherein at least one of said heating or melting chamber and said cooling chamber are provided with a radiation device and a contact device for transferring heat to the component arranged on a carrier device further comprising door mechanisms wherein the process chambers are designed as modular units which can be joined to one another via the door mechanisms wherein the process chambers are designed in a modular fashion, such that the door mechanisms are designed as door modules which can be combined with chamber modules to form the process chambers wherein the radiation device can be altered by means of a distance alteration device in its distance from the carrier device or the component wherein the carrier device is provided with a temperature sensor, whose output signal serves to define a correcting variable for altering the distance of the radiator device relative to the contact device.

11. The device as claimed in claim 10, further comprising a preparation chamber forming a process chamber independent of said melting chamber, said preparation chamber being arranged in front of the melting chamber for preparing the solder material carrier for the soldered joint.

12. The device as claimed in claim 10, further comprising a radiation device has having a temperable plate whose surface acts as contact device.

13. The device as claimed in claim 10, wherein the carrier device is provided with an information medium which cooperates with a reader device, such that after the carrier device enters a first process chamber the process running in the first process chamber and subsequently arranged process chambers is controlled by e information contained on the information medium.

14. A method for thermal treatment of workpieces, the method comprising the steps of:

providing a heating or melting chamber;

providing a cooling chamber connected to the heating or melting chamber;

sealing off the heating or melting chamber from an environment to provide an independent heating or melting chamber process atmosphere;

sealing off the cooling chamber from the environment to provide an independent cooling chamber process atmosphere;

melting solder material arranged on a solder material carrier by heating the component in the independent process atmosphere of the heating or melting chamber;

subsequent to said step of melting, cooling the component in the independent process atmosphere of the cooling chamber; and providing a tempering device which can be heated or cooled, such that the tempering device for heating or cooling is operated at an essentially constant temperature, wherein the tempering device is operated as a radiator device and the temperature of the component is adjusted by the distance of the radiator device from the component.

15. The method as claimed in claim 14, further comprising providing a preparation chamber forming a process chamber independent of said melting chamber, said preparation chamber being arranged adjacent to the melting chamber; and in a procedural step preceding heating of the component, preparing the component by application of a reducing or inert process atmosphere and/or via radiation or by application of a material in the preparation chamber.

16. The method as claimed in claim 14 further comprising providing a contact device for heating or cooling, such that temperature application takes place at least in one starting phase of the heating or cooling by means of conduction heat transfer for heating or cooling.

* * * * *